US008438418B2

(12) United States Patent
Ashraff et al.

(10) Patent No.: US 8,438,418 B2
(45) Date of Patent: May 7, 2013

(54) SIMPLIFYING AUTOMATED SOFTWARE MAINTENANCE OF DATA CENTERS

(75) Inventors: Mohammed H Ashraff, Bangalore (IN); Sriram Gopalswamy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 12/826,678

(22) Filed: Jun. 30, 2010

(65) Prior Publication Data

US 2012/0005520 A1    Jan. 5, 2012

(51) Int. Cl.
*G06F 11/00* (2006.01)
(52) U.S. Cl.
USPC .............................................. 714/4.1; 714/4.4
(58) Field of Classification Search .................. 714/4.11, 714/25, 48
See application file for complete search history.

(56) References Cited

U.S. PATENT DOCUMENTS

| | | | |
|---|---|---|---|
| 7,529,863 B2 | 5/2009 | MacKay et al. | |
| 2003/0195762 A1 | 10/2003 | Gleason et al. | |
| 2004/0088600 A1* | 5/2004 | Adir et al. | 714/1 |
| 2006/0190766 A1* | 8/2006 | Adler et al. | 714/13 |
| 2007/0022324 A1 | 1/2007 | Chang | |
| 2008/0059972 A1 | 3/2008 | Ding et al. | |
| 2010/0223499 A1* | 9/2010 | Panigrahy et al. | 714/19 |
| 2010/0287416 A1* | 11/2010 | Shacham et al. | 714/39 |

OTHER PUBLICATIONS

"Adam Belloum", "Dynamic Workflow", Virtual Laboratory for E-Science, Downloaded Circa: May 8, 2009, pp. 1-20.
"Data Center Automation Innovator", "Stratavia Corporation", http://www.stratavia.com/profile.php, Downloaded Circa: May 8, 2009, p. 1-1.
"Ed Tittel", "The Shortcut Guide to Run Book Automation", Realtime Publishers, Downloaded Circa: May 8, 2009, p. 1-76.
"Enigmatec Announces Upgraded Run Book Automation and Virtual Environment Management Products", http://www.enigmatec.com/news/news_press/enigmatec_announces_upgraded_run_bookautomation_and_virtual_environment_management_products, Downloaded Circa: May 8, 2009, p. 1-1.
"Hank Marquis", "Automating ITIL", http://www.itsmwatch.com/itil/article.php/3708941, Publication Date: Nov. 2, 2007, pp. 1-3.
"Opalis", "Opalis IT Process Automation", Downloaded Circa: May 8, 2009, p. 1-4.
"Run Book Automation", "Iwave Software" http://iwavesoftware.com/runbook.htm, Downloaded Circa: May 8, 2009, p. 1-1.
"Run Book Automation", "Singularity", http://www.singularity.co.uk/telco-run-book-autonomics.asp, Downloaded Circa: May 8, 2009, p. 1-1.
"Stephen Elliot", "Run-Book Automation: Taking ITIL Processes to the Next Level", IDC, Downloaded Circa: Sep. 2007, p. 1-3.

* cited by examiner

*Primary Examiner* — Scott Baderman
*Assistant Examiner* — Sarai Butler
(74) *Attorney, Agent, or Firm* — Narendra Reddy Thappeta

(57) ABSTRACT

An aspect of the present invention simplifies software maintenance of nodes in a data center. In one embodiment, a management system receives data specifying a set of commands to be executed on a node in the data center, and then forms a maintenance script by programmatically incorporating instructions for executing the set of commands on the node and to perform a set of management actions. The management system then executes the maintenance script to cause execution of the set of commands on the nodes, thereby performing maintenance of the node. A user/administrator of the data center needs to specify only the commands, thereby simplifying the software maintenance of data centers. According to another aspect, the maintenance scripts (formed by incorporating the commands provided by a user) are executed as part of a disaster recovery process in the data center.

16 Claims, 11 Drawing Sheets

Browser - Data Center Manager

| Home | Add a new Customer | Customer Details | View Logs | Plugin Manager | Checklist | Workflows | Dashboard |

300

Choose a customer: Test Customer (dcfizi) ▼ — 310

| | | |
|---|---|---|
| Customer Name | Test Customer | |
| Customer SID | *dcfizi | *Changed URL | *us.oracle.com.8888 |
| Customer Domain | *us.oracle.com | *Changed Public URL | *:443 |

Fetch Details — 315

320

| | |
|---|---|
| Database plugin: | DB-2.0 ▼ |
| Application plugin: | R12-2_0 ▼ |

| | | |
|---|---|---|
| Application Version | None ▼ | |
| CC Version | None ▼ | |
| Database Version | 10.2.0.2.0 ▼ | |
| Product Type | EBSO ▼ | |

330

Host Details[+]

| Hostname | Host Type | Location | Is Virtual | | |
|---|---|---|---|---|---|
| pserv0228 | MST-DB-TIER ▼ | Standby ▼ | PHYSICAL ▼ | [-] | ✎ |
| pserv0228 | MST-DB-TIER ▼ | Primary ▼ | PHYSICAL ▼ | [-] | ✎ |
| pserv0229 | CONCURRENT-MG ▼ | Standby ▼ | PHYSICAL ▼ | [-] | ✎ |
| vserv1048 | CONCURRENT-MG ▼ | Primary ▼ | PHYSICAL ▼ | [-] | ✎ |

| Execution Host | Sequence Id | Destination | Script Name | Script Description | Is Parallel |
|---|---|---|---|---|---|
| CONCURRENT-MGR | 2 | Standby | EBSO_HealthCheck.sh | application stack health check | TRUE |
| CONCURRENT-MGR | 3 | Primary | EBSO_ShutDown.sh | Stop Application service | FALSE |
| CONCURRENT-MGR | 3 | Standby | EBSO_ShutDown.sh | Stop Application service | FALSE |
| CONCURRENT-MGR | 5 | Standby | EBSO_Config.sh | application stack health check | FALSE |
| CONCURRENT-MGR | 7 | Standby | EBSO_StartUp.sh | Start Application service | FALSE |
| CONCURRENT-MGR | 8 | Standby | EBSO_AppsClone.sh | Clone application stack | FALSE |
| MST-DB-TIER | 1 | Standby | EBSO_DbClone.sh | Clone DB Tech stack | FALSE |
| MST-DB-TIER | 3 | Standby | EBSO_DbCloneFinal.sh | Final run of clone DB Tech stack | TRUE |
| MST-DB-TIER | 5 | Standby | DB_NetConfig.sh | Configure network | TRUE |

| Execution Host | Sequence Id | Destination | Script Name | Script Description | Is Parallel |
|---|---|---|---|---|---|
| MST-DB-TIER | 1 | Primary | DB_SwitchToStandby.sh | Convert primary db to standby | FALSE |
| MST-DB-TIER | 2 | Standby | DB_HealthCheck.sh | Database health check for Disaster Recovery setup | TRUE |
| MST-DB-TIER | 2 | Standby | DB_SwitchToPrimary.sh | Convert standby db to primary | FALSE |
| MST-DB-TIER | 3 | Standby | DB_FailOver.sh | Failover the standby db to primar | FALSE |
| MST-DB-TIER | 4 | Primary | DB_ShutDown.sh | Stop Database service | FALSE |
| SUB-DB-TIER | 1 | Standby | DB_ShutDown.sh | Stop Database service | FALSE |
| SUB-DB-TIER | 1 | Standby | DB_StartUp.sh | Stop Database service | FALSE |
| SUB-DB-TIER | 3 | Primary | DB_ShutDown.sh | Stop Database service | FALSE |

```
+ dcfizi                                    500
  ├── DB_RC_6_dcfizi.sh
  ├── DB_RC_7_dcfizi.sh
  ├── DB_RC_10_dcfizi.sh
  ├── DB_RC_dcfizi.sh
  ├── DB_SD_2_dcfizi.sh
  ├── DB_SD_12_dcfizi.sh
  ├── DB_SD_15_dcfizi.sh
  ├── DB_SD_dcfizi.sh
  ├── dcfizi.pre.log    ◀── 510
  ├── dcfizi.sh         ◀── 520
  ├── DNS_dcfizi.sh
  ├── runner.exp        ◀── 550
  ├── runner.sh         ◀── 560
  ├── SD_5_dcfizi.sh    ◀── 570
  ├── SD_6_dcfizi.sh
  ├── SD_7_dcfizi.sh
  ├── SD_8_dcfizi.sh
  ├── SD_9_dcfizi.sh
  ├── SD_dcfizi.sh      ◀── 580
  ...
```

520
```
#!/bin/sh
# This is a DR Central Script
For customer : dcfizi log=$3
if [[ ! -e runner.sh ]]; then
   cp /DR/runner.sh /DR/tmp
   cp /DR/runner.exp /DR/tmp
   cp /DR/remote_sh.exp /DR/tmp
fi sh SD_dcfizi.sh $1 $2 >> $log 2>&1        ◀── 525
sh DB_SD_dcfizi.sh $1 $2 >> $log 2>&1
sh SNAP_dcfizi.sh $1 $2  >> $log 2>&1
sh DB_RC_dcfizi.sh $1 $2 >> $log 2>&1
sh DB_ST_dcfizi.sh $1 $2 >> $log 2>&1
sh RC_dcfizi.sh $1 $2  >> $log 2>&1
sh VR_dcfizi.sh $1 $2 >>$log 2>&1
sh VC_dcfizi.sh $1 $2 >>$log 2>&1
sh DNS_dcfizi.sh $1 $2 >> $log 2>&1
sh ST_dcfizi.sh $1 $2 >> $log 2>&1
sh DB_HC_dcfizi.sh $1 $2 >> $log 2>&1
sh HC_dcfizi.sh  $1 $2 >> $log 2>&1

#End of Script
```

580
```
sh /DR/tmp/SD_5_dcfizi.sh $1 $2
sh /DR/tmp/SD_6_dcfizi.sh $1 $2    ◀── 585
sh /DR/tmp/SD_7_dcfizi.sh $1 $2
sh /DR/tmp/SD_8_dcfizi.sh $1 $2
sh /DR/tmp/SD_9_dcfizi.sh $1 $2 fg
echo 'MESSAGE: SHUTDOWN COMPLETE'
```

570
```
sh runner.sh vserv1048.us.oracle.com $1
$2 dcfizi ohscc 12.12
"EBSO_ShutDown.sh" "/DR/tmp/logs/
dcfizi_1266227828641.log"
"1266227828641" "/admin/DRP/1.0/
EBSO/bin:/admin/DRP/1.0/DB/bin" ap 0
```

FIG. 5A

```
# This script takes a host and command as parameter and runs the command on the host remotely
host=$1; username=$2; password=$3; sid=$4; pbrun=$5; tar=$6; command="$7"; log="$8";  ← 562
timestamp="$9"; shift; scriptsLocation="$9"; shift; type="$9"; shift; md5="$9"
command=`echo $command | tr -s " "`; filenameOfCommand=`echo "$command" | cut -d " " -f1` newsid=$sid; echo $sid | grep "o$"; testForOTO=$?

if [[ $testForOTO -eq 0 ]]; then
    newsid=`echo $sid|sed s/.$//`
fi echo $sid | grep "s$"
testForOTO=$?
if [[ $testForOTO -eq 0 ]]; then
    newsid=`echo $sid|sed s/.$//`
fi echo $sid |grep "-$"
testForPSOFT=$?
if [[ $testForPSOFT -eq 0 ]];then
    newsid2=`echo $sid | cut -c 1-5,7`
    actualsid=`echo $sid | sed s/.$//`
    expect /DR/tmp/runner.exp $host $username $password $newsid2 $pbrun $tar "$command" "$scriptsLocation"
        $type ${actualsid} | tee -a "/DR/tmp/host_logs/${host}_${actualsid}_${timestamp}" >> "$log"
    echo "MESSAGE : ALL TASKS COMPLETED" | tee -a "/DR/tmp/host_logs/${host}_${actualsid}_${timestamp}" >> "$log"
    exit 0
fi expect /DR/tmp/runner.exp $host $username $password $sid $pbrun $tar "$command" "$scriptsLocation"
    $type ${newsid} | tee -a "/DR/tmp/host_logs/${host}_${newsid}_${timestamp}" >> "$log"
echo "MESSAGE : ALL TASKS COMPLETED" | tee -a "/DR/tmp/host_logs/${host}_${newsid}_${timestamp}" >> "$log"
```

```
...
ssh_login $target $username $passwd  ← 551
...
if { $COMMAND == "WAIT" } {
    puts "MESSAGE FROM $target: WAITING FOR USER"
    while { 1 } {
      send -s -- "rm -f /tmp/WAIT_AT_$newsid.wai\r"
      expect -re "$prompt"
      send -s -- "rm -f /tmp/WAIT_AT_$newsid.tmp\r"
      expect -re "$prompt"
      send -s -- "mkfifo /tmp/WAIT_AT_$newsid.wai\r"
      expect -re "$prompt"
      send -s -- "chmod 777 /tmp/WAIT_AT_$newsid.wai\r"
      expect -re "$prompt"
      send -s -- "cat /tmp/WAIT_AT_$newsid.wai > /tmp/WAIT_AT_$newsid.tmp\r"
      expect -re "$prompt"
      send -s -- "grep CONTINUE /tmp/WAIT_AT_$newsid.tmp\r"
      expect -re "$prompt"
      set reVal [ checkLastCommandStatus ]
       if { $reVal == 0 } {
            puts "MESSAGE FROM $target: WAIT ENDED"
          send -s -- "echo 'DONE' > /tmp/WAIT_AT_$newsid.tmp\r"
          expect -re "$prompt"
          exit 0
       }
       sleep 10
    }
}
....
while { 1 } {
if { $cont == 1 } { break }
set retVal 0
send -s -- "$COMMAND\r"  ← 556
set retVal [ checkLastCommandStatus ]  ← 557
sleep 2
if { $retVal == 0 } {
     break
}
if { $retVal != 0 } {
  sleep 2
  puts "MESSAGE FROM $target: ERROR FOUND"
  set timeout -1
  while { 1 } {
     sleep 5
     ...
        send -s -- "grep ABORT /tmp/ERROR_AT_$newsid.tmp\r"
     set reVal [ checkLastCommandStatus ]
     if { $reVal == 0 } {
           puts "MESSAGE FROM $SID: TASK KILLED"
            exit 1
      }
   }
}
}
send -s -- "echo 'DONE' > /tmp/ERROR_AT_$newsid.tmp ; chmod 777 /tmp/
ERROR_AT_$newsid.tmp\r"
expect -re "$prompt"
puts "MESSAGE FROM $target: TASK COMPLETED"  ← 559
```

*FIG. 5C*

Browser - Data Center Manager

Home | Add a new Customer | Customer Details | View Logs | Plugin Manager | Checklist | Workflows | Dashboard 620 → dcfizi
Choose a customer Instance

Live log2: dcfizi
0_DCFIZI adrepctl.sh Stopped
Oracle Fulfillment Server DCFIZI_vserv1047 jtffmctl.sh Stopped
Oracle Discoverer services DCFIZI_vserv1047 addisctl.sh Stopped
Oracle Restricted Apache Server DCFIZI_vserv1047 adaprstctl.sh Disabled
Oracle Apache Server DCFIZI_vserv1047 for PL/SQL adapcctl.sh Disabled
Oracle TGF SocketServer DCFIZI_vserv1047 adtctl.sh Disabled
Oracle FormsServerForms60DCFIZI_vserv1047 adfmctl.sh Disabled
Oracle Metrics Client DCFIZI_vserv1047 adfmcctl.sh Disabled
Oracle Metrics Server DCFIZI_vserv1047 adfmsctl.sh Disabled
Oracle ICSM DCFIZI_vserv1047 ieoicsm.sh Disabled
Oracle iProcurement Buk Loader DCFIZI_vserv1047 icxbkctl.sh Disabled ServiceControl is exiting with status 0

DR SHELL] retvalue="RC-$?"
DR SHELL] echo $retvalue
RC=0
DR SHELL] echo 'DONE'>/tmp/ERROR_AT_dcfizi.tmp ; chmod 777 /tmp/ERROR_AT_dc DR SHELL] MESSAGE FROM vserv1048.us.oracle.com: TASK COMPLETED
MESSAGE: ALL TASK COMPLETED
spawn ssh toot@vserv1048.usoracle.com
root@vserv1048.us.oracle.com's password:
Last login: Sun feb 14 22:22:01 2010 from pserv0226.us.oracle.com

[root@vserv1048 root]# pbrun ohscc-u apdcfizi
Enter the TAR#:
You Entered TAR# :12.12

630

Debugger
Error found at host:
vserve1048.us.oracle.com

Retry  Ignore  Abort

680

Topology of dcfizi

Primary Hosts        Standby Hosts
● vserv1048          pserve0228
○ pserv0228          pserv0229

660

Login   Kill         Kill All

Currently selected host: No host selected

SIMPLIFYING AUTOMATED SOFTWARE MAINTENANCE OF DATA CENTERS

BACKGROUND OF INVENTION

1. Technical Field

The present disclosure relates to software maintenance, and more specifically to simplifying automated software maintenance of data centers.

2. Related Art

Data centers house various infrastructure elements (referred to as "nodes") that operate together to provide services to users on behalf of a single customer or multiple customers (with the nodes shared by the customers). Such infrastructure elements provide computation or communication capability and generally include computer systems, storage systems, network devices, security devices (firewalls, etc.), etc.

There is a general need to perform software maintenance on various nodes of a data center. For example, when nodes providing services on behalf of a customer become unavailable for processing user requests (termed as the occurrence of a "disaster"), it may be necessary that software maintenance be performed on equivalent nodes (having similar processing capability as the failed nodes) in the data center to make the nodes 'software ready' (i.e., installation, configuration and/or starting up the software) for resuming processing of user requests (termed as "recovery").

Software maintenance of a node implies that one or more software components (such as applications, the run-time environments, drivers, etc.) are added/installed, removed/uninstalled, started up, stopped, status checked, configured, etc., on the nodes, to ensure that nodes are ready for processing user requests. Such software maintenance tasks are generally performed by executing corresponding commands on the nodes using appropriate software present in the nodes.

Automated software maintenance refers to the process of performing a pre-specified set of commands (referred to as a "run book") on one or more nodes in a data center, in response to the occurrence of a pre-defined event (e.g., disaster/recovery, etc.). In general, different run books need to be specified based on the type (e.g. computer system, network device, etc.) of nodes on which the maintenance needs to be performed, the event in response to which the run book is to be performed, the specific run-time environment/software present in each node, etc.

It may be desirable that the automated software maintenance of data centers be further simplified, in particular, to reduce the amount of time and/or resources required for specifying different run books to be executed for different nodes in a data center.

BRIEF DESCRIPTION OF THE DRAWINGS

Example embodiments of the present invention will be described with reference to the accompanying drawings briefly described below.

FIG. 3A depicts the manner in which user/administrator specifies the nodes on which software maintenance is to be performed in one embodiment.

FIG. 4A depicts a sample set of commands directed to configuration of an application installed in the nodes of a data center in response to the occurrence of a disaster in one embodiment.

FIG. 4B depicts a sample set of commands specified for configuration of databases installed in the nodes of a data center in response to the occurrence of a disaster in one embodiment.

FIGS. 5A-5C together depicts sample maintenance scripts formed by programmatically incorporating appropriate management actions with user specified commands in one embodiment.

FIG. 6 depicts the manner in which the status of execution of the maintenance scripts (formed by programmatically incorporating management actions and user specific commands) is provided to a user/administrator in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention simplifies software maintenance of nodes in a data center. In one embodiment, a user is enabled to specify a sequence of component scripts to be executed as corresponding commands on a specific node in the data center, with each component script designed to perform a corresponding maintenance task on the specific node in the data center. A maintenance script containing instructions which when executed on a management system cause the management system to remotely execute the sequence of component scripts on the specific node is then formed. The formed maintenance script is then executed on the management system to cause the sequence of component scripts to be executed on the specific node, thereby performing maintenance of the specific node.

According to another aspect of the present invention, the maintenance script is formed by programmatically incorporating instructions for executing a set of management actions on the management system and a set of commands (e.g., the identifiers of the component scripts), where the execution of the management actions on the management system causes the remote execution of the commands on the nodes in the data center.

Thus, a user needs to specify only the commands (e.g., the identifiers of the component scripts) to be remotely executed on the node, without specifying the management actions to be performed on the management system. Accordingly, the automated software maintenance of data centers is simplified.

According to yet another aspect of present invention, the maintenance scripts (formed by incorporating the commands provided by a user) are executed as part of a disaster recovery process in a data center. In one embodiment, the maintenance scripts are executed in response to identifying that a primary set of nodes (which operate together to provide services to users during normal operation) become unavailable, thereby causing a standby set of nodes (in the same/different data center) to provide the same services to the users.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
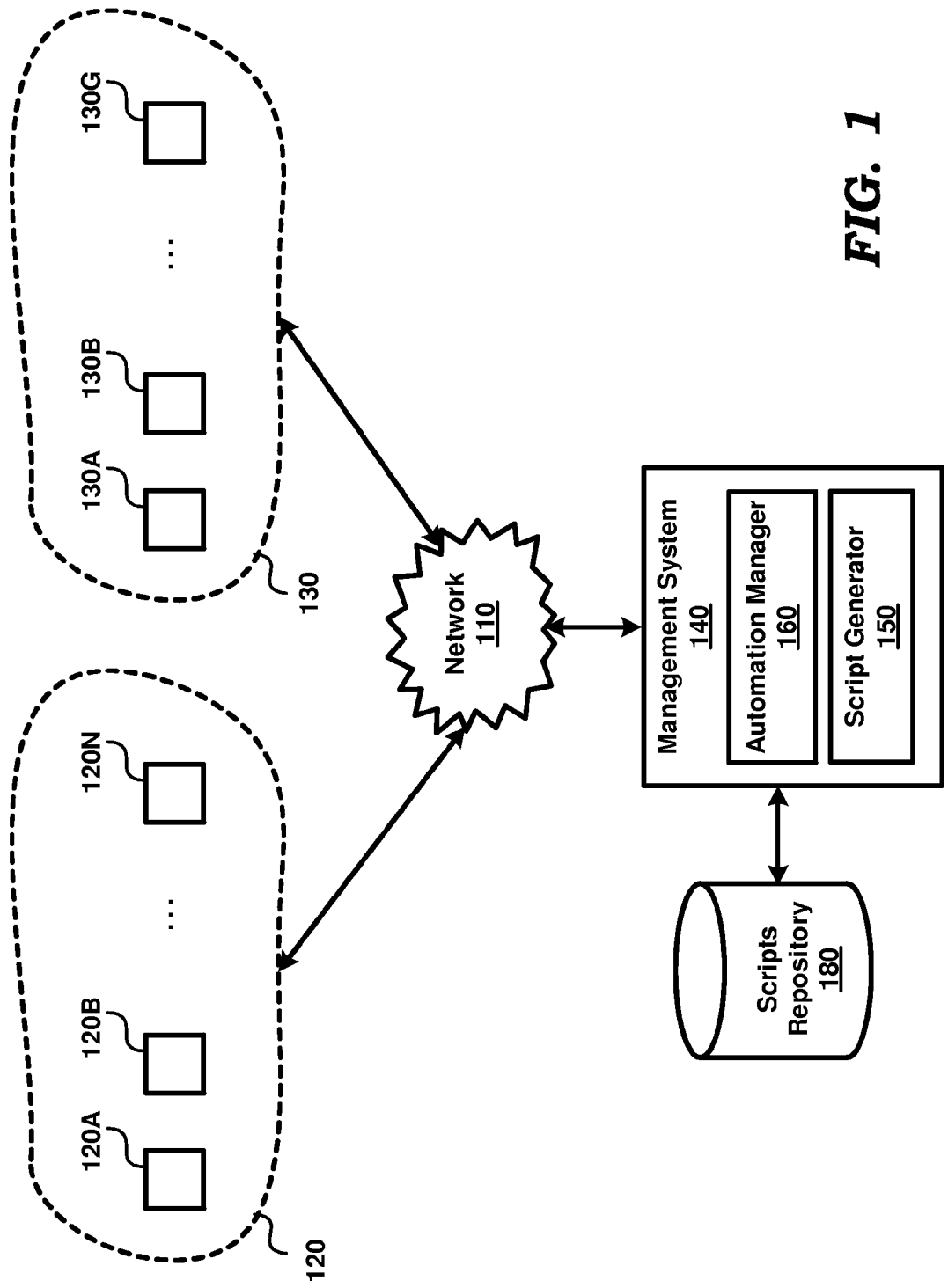
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing network 110, data centers 120 (shown containing nodes 120A-120N) and 130 (shown containing nodes 130A-130G), management system 140 (shown containing script generator 150 and automation manager 160), and scripts repository 180.

Merely for illustration, only representative number/type of systems is shown in FIG. 1. Many environments often contain many more data centers, systems, both in number and type, depending on the purpose for which the environment is designed. Each system/device of FIG. 1 is described below in further detail.

Network 110 provides connectivity between management system 140, nodes 120A-120N of data center 120 and nodes 130A-130G of data center 130. Network 110 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by network 110.

Data center 120 represents a facility that houses infrastructure elements (nodes 120A-120N) that operate together to provide services to users on behalf of one or more customers. Each of nodes 120A-120N may represent one of a computer system hosting applications capable of processing user requests for services, a storage system maintaining data used by the applications while processing user requests, a network device providing connectivity between the nodes, etc. Data center 130 housing nodes 130A-130G represents another facility similar to data center 120 which provides additional services to users. Though each of data centers 120 and 130 is shown containing only a few nodes for convenience, it may be appreciated the number of the nodes in a data center is generally very large (e.g., in the range of 1000-10000).

Management system 140 represents a system such as a personal computer, workstation, mobile station, etc., used by users/administrators to perform software maintenance of the various nodes in data centers 120/130. The software maintenance of a node may be performed by remotely executing (on the node) commands to add/install, remove/uninstall, start up, stop, check the status, configure, etc. one or more software components such as applications, the run-time environments, drivers, etc. executing in the node. The remote execution of the commands on the nodes may cause the node to be "software ready" for processing user requests.

In one embodiment, a user/administrator specifies run books (hereafter referred to as "maintenance scripts") containing sets of commands to be executed on one or more nodes in data centers 120/130 in response to corresponding predefined events (e.g., disaster/recovery, software update, monthly maintenance, etc.). The user/administrator may also specify the desired software component (such as an operating system shell, database agent, etc.) to be used on each of the nodes for remote execution of the commands. The user/administrator also generally specifies additional instructions for logging the execution of the commands, identifying the occurrence of errors by inspecting the results of execution of the commands, handling the identified errors, etc.

Scripts repository 180 represents a non-volatile storage facilitating storage and retrieval of maintenance scripts specified by users/administrators. In one embodiment, scripts repository 180 is implemented as a file store providing storage and retrieval of data in the form of one or more files organized as one or more directories, as is well known in the relevant arts. Alternatively, scripts repository 180 may be implemented using relational database technologies and therefore provide storage and retrieval of data using structured queries such as SQL (Structured Query Language).

Automation manager 160 executing in management system 140 is designed to execute maintenance scripts maintained in scripts repository 180 in response to identifying the occurrence of associated events. For example, on receiving an indication that a disaster has occurred (a primary set of nodes is unable to process user requests), automation manager 160 may retrieve the corresponding set of maintenance scripts (designed to make "software ready" a standby set of nodes) from scripts repository 180 and remotely execute each of the commands specified in the maintenance scripts on the standby set of nodes. Typically, a disaster is declared by appropriate person administering the data center, after appropriate check of the availability of the service.

Furthermore, to remotely execute the commands, automation manager 160 may be designed to connect to the software component specified in the maintenance script, send a command to the software component for remote execution and then receive the result of execution of the command on the node (used to identify the occurrence of errors).

Thus, automation manager 160 facilitates automated software maintenance of nodes in data centers 120/130. It may be appreciated that a user/administrator may be required to specify a larger number of different maintenance scripts for a single event due to the differences in the types (e.g. computer system, network device, etc.) of nodes on which the maintenance needs to be performed, the specific run-time environment/software present in each node, etc. Thus, a user/administrator may be required to spend considerable amount of time and/or resources for specifying the various maintenance scripts to be executed in response to a single event, in particular, when the data center houses a large number of nodes.

It may be desirable that the automated software maintenance of nodes in a data center be further simplified, in particular, by reducing the amount of time and/or resources required for specifying different maintenance scripts. Script generator 150 provided according to several aspects of the present invention simplifies automated software maintenance as described below with examples.

3. Simplifying Automated Software Maintenance

Figure 2:
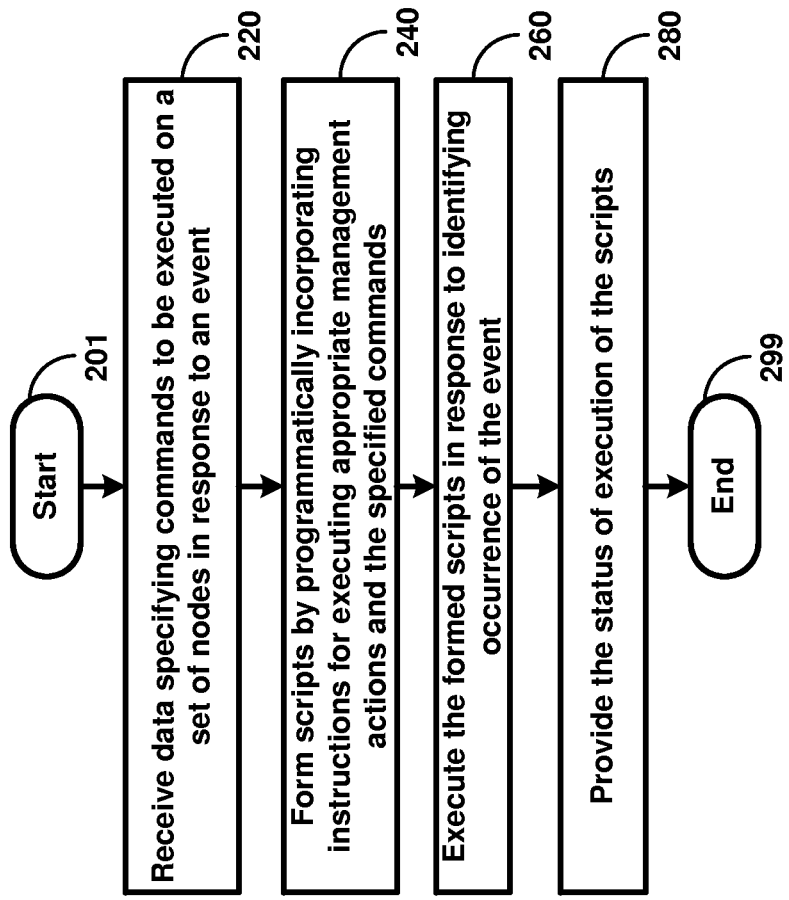
FIG. 2 is a flow chart illustrating the manner in which automated software maintenance of data centers is simplified according to an aspect of the present invention.

FIG. 2 is a flow chart illustrating the manner in which automated software maintenance of data centers (such as 120/130) is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, script generator 150 receives data specifying commands to be executed on a set of nodes (in data center 120/130) in response to an event (e.g., occurrence of a disaster). Commands are generally in the form of text (set of human understandable characters), which when executed on the nodes cause the corresponding maintenance tasks to be performed on the node. The commands may be received from users/administrators of the data centers using an appropriate user interface and may be maintained in a non-volatile storage (not shown in FIG. 1) for subsequent usage. The received commands may be directed to add, remove, start up, stop, status check, configure, etc., one or more software components on the set of nodes, thereby making the nodes "software ready" for processing user requests.

In step 240, script generator 150 forms maintenance scripts by programmatically incorporating appropriate management actions and the specified commands (which may be retrieved from the non-volatile storage). The term "programmatic incorporation" implies that the user/administrator specifies only the commands (without the management actions), and script generator 150 includes the appropriate management actions with the commands specified by the user/administrator to form the maintenance scripts.

The management actions represent all actions (e.g., logging on) that would be necessary for execution of the commands received in step 220, or desirable for associated requirements such as effective error handling. The management actions incorporated by script generator 150 are generally in the form of additional instructions in the formed maintenance script. Examples of such management actions include, selecting the appropriate software component to be used for remote execution, logging the execution of the commands, identifying the occurrence of errors by inspecting the results of execution of the commands provided by automation manager 160, handling the identified errors, etc.

In one embodiment, script generator 150 forms the maintenance scripts and stores the formed scripts in script repository 180, thereby enabling automation manager 160 to execute the formed scripts in response to occurrence of a corresponding event. By storing the maintenance scripts to be executed, the time to respond to the occurrence of a disaster may be reduced. Furthermore, if management system 140 itself is unavailable due to the disaster (or other reasons), other systems can be used to execute the stored maintenance scripts.

In step 260, automation manager 160 executes the formed maintenance scripts in response to identifying the occurrence of the event (specified by the data received in step 220). Execution of a script causes the commands received in step 220 (in addition to the management actions) to be remotely executed on the desired set of nodes. As noted above, the remote execution of the commands may require automation manager 160 to connect to specific software components executing on the set of nodes, send the commands to the software components, and receive the results of execution of the commands.

In step 280, automation manager 160 provides the status (and the results) of execution of the maintenance scripts. The status and/or results of execution may be provided to users/administrators of the data centers by displaying the status/results in an appropriate user interface. The flow chart ends in step 299.

Thus, by requiring a user/administrator to specify only the commands to be executed and then programmatically incorporating the management actions, the automated software maintenance of nodes in a data center is simplified. Furthermore, the amount of resources and/or time required for specifying different maintenance scripts is also considerably reduced.

The description is continued illustrating the manner in which the steps of FIG. 2 are implemented in one embodiment.

4. Example Implementation

FIGS. 3A-3B, 4A-4B, 5A-5C and 6 together illustrate the manner in which automated software maintenance of data centers is simplified in one embodiment. Each of the Figures is described in detail below.

The description is continued assuming that automated software maintenance is performed as part of a recovery process in response to the occurrence of a disaster for a customer. In other words, when a set of nodes in a data center (referred to as the primary nodes) configured to provide services on behalf of the customer become unavailable, automated software maintenance is performed on a equivalent set of nodes (referred to as the standby nodes) in the same/different data center to make the standby nodes ready for processing user requests.

Figure 3B:
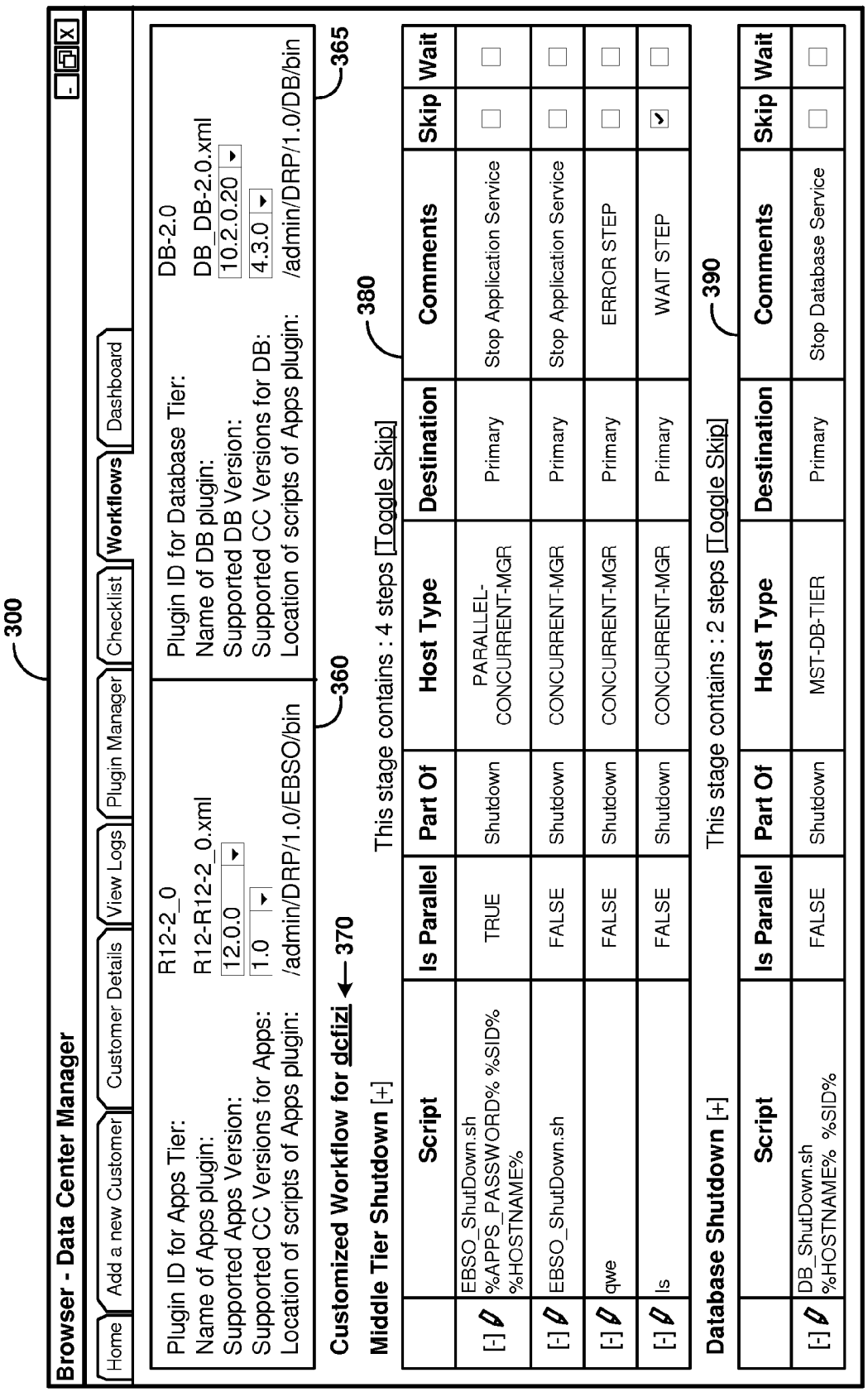
FIG. 3B depicts the manner in which a user/administrator specifies/customizes the commands to be executed on nodes in a data center in one embodiment.

FIG. 3A depicts the manner in which user/administrator specifies the nodes on which software maintenance is to be performed in one embodiment. Display area 300 (also in FIG. 3B) and display area 600 (in FIG. 6) depicts a portion of a user interface that may be displayed on a display unit (not shown) associated with management system 140. In one embodiment, the user interface is provided as a web page that can be viewed using a web browser, and accordingly the user/administrator can use any system that has a web browser to manage the software maintenance of nodes in data centers 120/130.

Display area 300 of FIG. 3A enables a user/administrator to specify the specific nodes in a data center (such as 120/130) that are used for providing services on behalf of a customer. Accordingly, a user/administrator may select the desired customer "dcfizi" in list box 310 and select button 315 (labeled "Fetch Details") to retrieve the details of the customer. The user may then add/modify the details of the customer such as the name, the unique SID, domain, URL, etc in display area 320.

In display area 330, the user specifies the names of the plugins/files (e.g. "DB-2.0") containing the default commands to be performed on the nodes, and also the versions (e.g. "10.2.0.2.0"), product types (e.g. "EBSO"), etc. of the software components (database and application) installed on the nodes on which maintenance is sought to be performed. Thus, display area 330 indicates that the commands specified in the plugin/file "DB-2.0" (portions of which are shown in Appendix B) are to be performed on a database component installed on the nodes, and also that the commands specified in the plugin/file "R12-2_0" (portions of which are shown in Appendix A) are to be performed on an application component installed on the nodes.

In display area 340, the user specifies the details of the primary and standby nodes for the customer such as the name of the node/system "Hostname", the type of the node/system "Host Type", whether the node is a primary or standby node "Location" and whether the node is a physical or a virtual node "Is Virtual". The user may add any number of nodes using the "[+]" button, remove previously added nodes using the "[−]" button and edit the details of the added nodes using the pen-icon button. Each of systems "pserv0228", "pserv0229", etc. may represent one of nodes 120A-120N of data center 120 or nodes 130A-130G of data center 130.

Thus, a user/administrator specifies the primary nodes (which normally process user requests) and the standby nodes (which process user requests when a disaster occurs, and on which automated software maintenance needs to be performed) for a customer "dcfizi". The user/administrator also specifies the (default) set of commands to be executed on the various nodes as a part of the recovery process (in the event of a disaster). The manner in which a user/administrator may view and/or edit (customize) the default commands for the customer "dcfizi" is described below with examples.

5. Specifying Commands for Remote Execution

FIG. 3B depicts the manner in which a user/administrator specifies/customizes the commands to be executed on nodes in a data center in one embodiment. Display area 300 of FIG. 3B enables the user to customize one or more workflows, with each workflow specifying the set of commands to be executed for performing a maintenance task such as application/middle-tier shutdown, database shutdown, etc.

Accordingly, the user is shown editing workflow 380 for application/middle-tier shutdown and workflow 390 for data base shutdown using display area 300 of FIG. 3B. Display area 360 indicates that workflow 380 is specified in the plugin/file named "R12-2_0", while display area 370 indicates that workflow 390 is specified in the plugin/file named "DB-2.0" Both workflows 380 and 390 are indicated to be customized for customer "dcfizi" (text 370).

Workflow 380 is shown containing four commands for shutting down an application specified as four rows of a table. Each row specifies a corresponding command to be executed "Script" (with the identifiers in the form "%...%" specifying parameters to be substituted before execution), whether the command is to be executed sequentially or in parallel "Is Parallel", the maintenance task the command achieves by execution "Part Of", the type of nodes on which the command is to be executed "Host Type", whether the command is to be performed on the primary or standby nodes "Destination", description of the command "Comments", whether the command is to be included in the next maintenance "Skip" and whether automation manager 160 has to wait for a user input after a command is executed "Wait". Workflow 390 similarly shows commands for shutting down a database in the form of a table.

It is noted that some of the commands such as "EBSO_ShutDown.sh" represent the identifiers of pre-defined component scripts (either maintained on the nodes or in scripts repository 180), each component script containing instructions directed to performing a specific maintenance task (such as shutdown, startup, recover, etc.) for a specific software component such as an application or database. These component scripts may be provided by vendors of the corresponding software component.

Thus, a user may specify commands (shown in script column of table 380 in FIG. 3B, in the illustrative example) to be executed on the different types of nodes in a data center (such as 120/130). It may be observed that the user specifies only the commands to be executed on the different nodes in the data center. A sample set of commands that may be specified by a user/administrator for performing disaster recovery is described below with examples.

6. Sample Set of Commands for Disaster Recovery

FIGS. 4A and 4B together illustrate a sample set of commands specified for disaster recovery on nodes of a data center in one embodiment. The sample set of commands may be specified by a user/administrator using the interface of FIG. 3B. Each of the Figures is described in detail below.

FIG. 4A depicts a sample set of commands directed to configuration of an application installed in the nodes of a data center in response to the occurrence of a disaster in one embodiment. Only a sample set of commands is shown in a table 420 for convenience. A more comprehensive set of commands for configuration of application is shown in Appendix A.

Table 420 depicts a set of commands for configuration of an application, with each row specifying the type of the node "Execution Host", the sequence in which the commands are to be executed on the nodes "Sequence Id", whether the command is to be executed in primary or standby nodes "Destination", the command in the form of the identifier of the component script to be executed "Script Name", a description of the component script "Script Description" and whether the command is to be performed sequentially or in parallel on the different nodes "Is Parallel".

It may be observed that table 420 contains 6 commands for the node type "CONCURRENT-MGR" that are to be executed according to the sequence specified by "Sequence Id", with 5 of the commands to be performed on the standby nodes and 1 command to be performed on the primary nodes. The commands together operate to check the health of the application stack installed in the standby nodes "EBSO_HealthCheck.sh", to shutdown/stop the application services on both the primary and standby nodes "EBSO_ShutDown.sh", to configure and check the application service on the standby nodes "EBSO_Config.sh", to start the application service on the standby nodes "EBSO_StartUp.sh" and to clone the application stack (that is execute the same application as in the primary nodes) on the standby nodes "EBSO_AppsClone.sh".

Thus, the 6 commands on execution on nodes of type "CONCURRENT-MGR" (such as "pserv0229" and "vserv1048" specified by the user for a customer "dcfizi" in display area 340 of FIG. 3A) causes the application services executing on the primary nodes to be shutdown, while ensuring that the same application services are made available on the standby nodes for processing user requests on behalf of the customer "dcfizi". The description is continued illustrating a sample set of commands for configuration of databases installed in nodes of a data center.

FIG. 4B depicts a sample set of commands specified for configuration of databases installed in the nodes of a data center in response to the occurrence of a disaster in one embodiment. Only a sample set of commands is shown in a table 460 for convenience. A more comprehensive set of commands for configuration of a database is shown in Appendix B. Table 460 depicts a set of commands for configuration of a database similar to table 420, and accordingly the description of the columns in not repeated here for conciseness.

It may be observed that table 460 contains 5 commands for the node type "MST_DB_TIER" that are to be executed according to the sequence specified by "Sequence Id", with 3 of the commands to be performed on the standby nodes and 2 commands to be performed on the primary nodes. The commands together operate to switch the database installed on the primary node to standby mode "DB_SwitchToStandby.sh", to check the database on the standby nodes "DB_HealthCheck.sh", to switch the database installed on the standby nodes from standby mode to primary mode "DB_Switch-ToPrimary.sh", to set the failover for the standby nodes as the primary nodes "DB_FailOver.sh" and to shutdown/stop the database service on the primary nodes "DB_Shutdown.sh".

Thus, the 5 commands on execution on nodes of type "MST_DB_TIER" (such as "pserv0228" specified by the user for a customer "dcfizi" in display area 340 of FIG. 3A) causes the database services executing on the primary nodes to be shutdown, while ensuring that the same database services are made available on the standby nodes for processing user requests on behalf of the customer "dcfizi".

Accordingly, the sample set of commands shown in table 420 and 460 (and in its entirety in Appendices A and B) when executed ensures that standby nodes are ready to process user requests in response to occurrence of a disaster in the primary nodes. As noted above, the user specifies only the set of commands to be executed on the different types of nodes in a data center.

In one embodiment, the user specified set of commands is stored in a non-volatile storage in the form of a file encoded using extensible markup language (XML) format (similar to the format shown in Appendices A and B). The stored user specified commands may then be used to form maintenance scripts for execution on the nodes in the data center.

Script generator 150, provided according to an aspect of the present invention, forms the maintenance scripts by programmatically incorporates additional instructions for logging, error handling, etc. (in general, management actions) and the user specified commands. A sample set of maintenance scripts formed based on the user specified commands shown in FIGS. 4A and 4B is described below with examples.

7. Sample Maintenance Scripts

FIGS. 5A-5C together depicts sample maintenance scripts formed by programmatically incorporating appropriate management actions with user specified commands in one embodiment. Only a representative number of formed maintenance scripts are shown for conciseness. However, in a realistic scenario, a large number of maintenance scripts may be formed by script generator 150, generally, corresponding to each node on which the software maintenance is sought to be performed and for each software component sought to be configured/maintained on the node.

Furthermore, the content of each of the maintenance scripts is shown to contain only a representative set of instructions (for logging and error handling) according to a shell scripting language (well known in UNIX type environments) for better understanding the features of the invention. However, the features of the present invention can be implemented for incorporating more number of management actions, for more complex sets of instructions and other programming languages/environments (such as PERL) as will be apparent to one skilled in the relevant arts by reading the disclosure herein.

Files 500 represent a sample set of maintenance scripts formed for the commands shown in FIGS. 4A and 4B. File 510 "dcfizi.pre.log" is used to maintain the log of the state of the system before execution of the commands. File 520 "dcfizi.sh" represents the central maintenance script which orchestrates the execution of the commands on the different nodes in the data center. Accordingly, the content of file 520 is shown containing invocations of other scripts (e.g. line 525) that are directed to executing the commands of a single type (such as "shutdown", "recovery", etc.).

Thus, line 525 is an invocation of file 580 "SD_dcfizi.sh" which is directed to executing "Shutdown" commands. The content of file 580 is shown containing invocation of scripts that are directed to executing the "shutdown" commands on specific nodes. For example, line 585 is an invocation of file 570 "SD_6_dcfizi.sh" which is directed to node named vserv1048 as indicated in the content of file 570. The content of file 570 further specifies that the component script named "EBSO_ShutDown.sh" is to be remotely executed on the node "vserv1048" using file 560 "runner.sh".

Referring to FIG. 5B, the content of file 560 is shown containing instructions (programmatically incorporated by script generator 150) directed to remote execution of a command. In particular, code portion 565 is shown invoking the "expect" tool which facilitates automation (using a scripting language) of applications that are accessed using a UNIX terminal. The "expect" tool is shown as being invoked with file 550 "runner.exp" which contains instructions in the scripting language supported by the expect tool.

It may be observed that the output of execution of the expect tool is shown as being directed to a log file (as indicated by the text ">>$log"). The log file is determined as the value of the eighth command line parameter (as indicated by $8 in line 562). As such, for the invocation of "runner.sh" in file 560, the output of execution of the command/component script "EBSO_ShutDown.sh" is logged in the log file "/DR/tmp/logs/dcfizi_1266227828641.log". The output of execution of other user specified commands/component scripts may be similarly logged.

Referring to FIG. 5C, the content of file 550 "runner.exp" is shown containing instructions (programming incorporated by script generator 150) corresponding to various management actions. Only relevant portions of the file are shown in FIG. 5C for conciseness. The complete listing of the file "runner.exp" is shown in Appendix C.

Line 551 ("ssh") is directed to establishing a secure connection to an operating system shell executing on a node (as indicated by the value of the variable "$target") as is well known in UNIX like environments. Code portion 553 is designed to wait for a user input after the execution of a command based on whether a user/administrator selects the checkbox in the "Wait" column for the command in display area 380/390 of FIG. 3B.

Code portion 555 is designed to send a command to the remote shell (line 556), to receive the status of execution of the command (line 557), to check whether an error occurred during execution by checking the received status and to re-execute the command if an error is determined to have occurred (due to the "while {1}" instruction). On successful execution of the command, a completed message is logged as indicated by line 559.

Thus, script generator 150 programmatically incorporates instructions for performing management actions such as logging, error handling, etc. along with the user specified commands to form maintenance scripts (files 500). Script generator 150 may store the formed scripts (files 500) in scripts repository 180 for subsequent use by automation manager 160.

Accordingly, in response to identifying that a disaster has occurred at the primary nodes of the customer "dcfizi", automation manager 160 retrieves the formed maintenance scripts (files 500) from scripts repository 180 and executes the maintenance scripts to cause the standby nodes of the customer "dcfizi" to be made software ready for resuming the processing of user requests.

Automation manager 160 may also the status of execution of the maintenance scripts to a user/administrator of the data center to enable the user to verify that the recovery was successfully performed and/or to perform manual tasks (if manual intervention is required or on occurrence of errors during execution) for successful recovery. The manner in which automation manager 160 may provide the status of execution of the maintenance scripts is described below with examples.

8. Providing Status of Execution

FIG. 6 depicts the manner in which the status of execution of the maintenance scripts (formed by programmatically incorporating management actions and user specific commands) is provided to a user/administrator in one embodiment. Display area 600 depicts a portion of a user interface providing the status of execution of maintenance scripts for the customer "dcfizi" as indicated by text 620.

Display area 630 displays the output of execution of the various commands specified in the maintenance scripts. The information displayed in display area 630 may correspond to the information logged in the log files during the execution of a command due to the enabling of the logging management action in file 560 "runner.sh" by script generator 150.

Display area 640 displays the primary nodes (under the column heading "Primary Hosts" and the standby nodes (under the column heading "Standby Hosts") of the customer "dcfizi". It may be observed that the primary/standby nodes shown in display are 640 corresponds to the corresponding nodes defined by the user/administrator in display area 340 of FIG. 3A.

Action panel 660 enables a user/administrator (by selecting the corresponding icons) to login to a node selected from the displayed list of nodes, to kill the maintenance script/command currently executing on the selected node and to kill all the scripts/commands currently executing on the nodes.

Display area 680 (titled "Debugger") indicates to the user/administrator that an error has occurred during the execution of a command/script. Furthermore, the user/administrator is enabled to select the manner in which the error is to be handled, namely, whether to "retry" execution of the command, to "ignore" the error and continue execution of the next command in a script, or to "abort" execution of the rest of the commands specified in a script.

While the features of above are described as being used for disaster recovery, it should be appreciated that the maintenance script can be used in other contexts (such as routine monthly maintenance), as will be apparent to one skilled in the relevant arts by reading the disclosure provided herein.

It should be appreciated that the features described above can be implemented in various embodiments as a desired combination of one or more of hardware, executable modules, and firmware. The description is continued with respect to an embodiment in which various features are operative when executable modules are executed.

9. Digital Processing System

Figure 7:
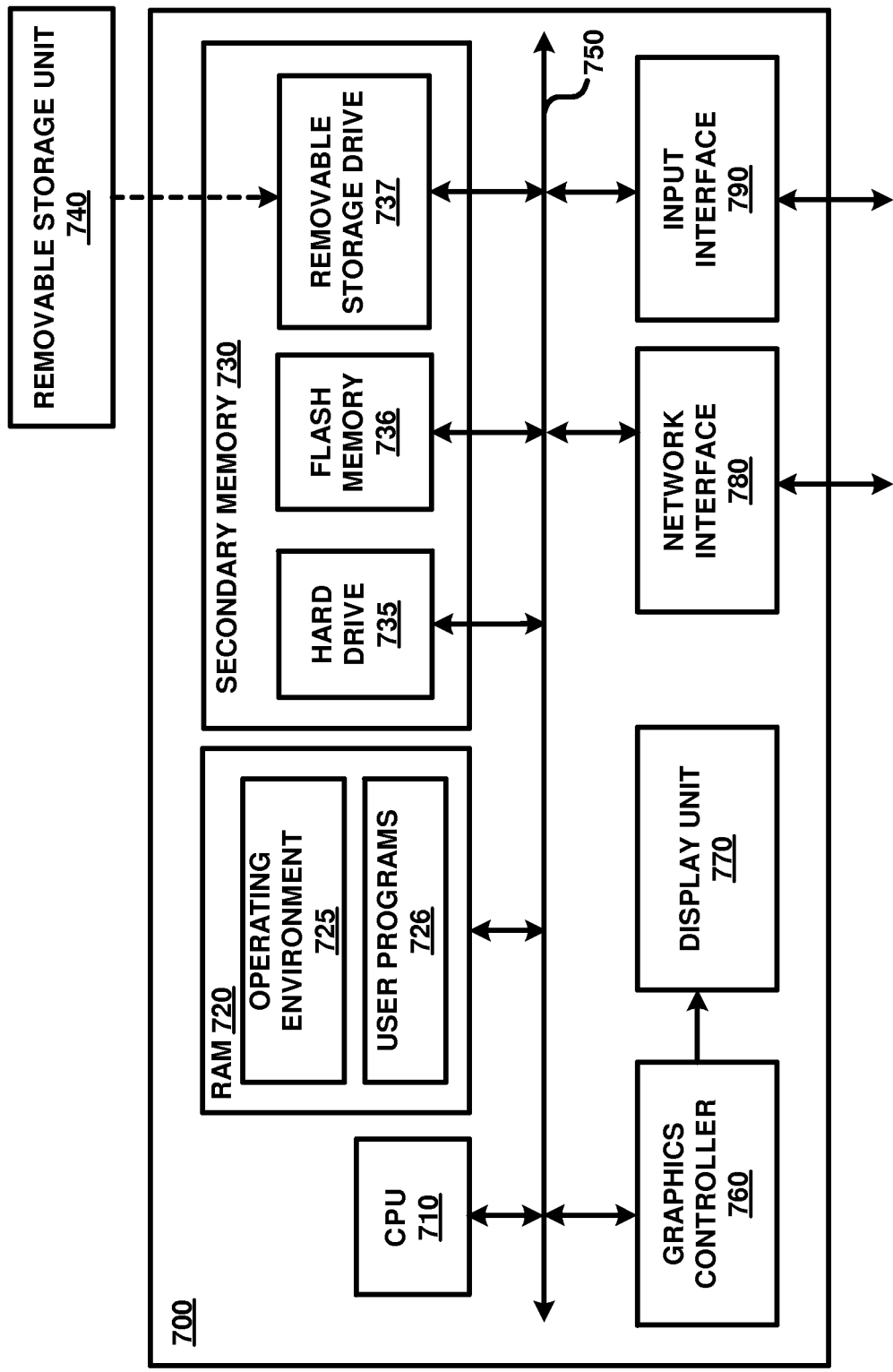
FIG. 7 is a block diagram illustrating the details of digital processing system 700 in which various aspects of the present invention are operative by execution of appropriate executable modules.

FIG. 7 is a block diagram illustrating the details of digital processing system 700 in which various aspects of the present invention are operative by execution of appropriate executable modules. Digital processing system 700 may correspond to any system (such as management system 140) executing script generator 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting operating environment 725 and/or other user programs 726 (such as data center management applications, node monitoring softwares, etc.). In addition to operating environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images (such as the portions of the user interface of FIGS. 3A, 3B and 6) defined by the display signals. Input interface 790 may correspond to a keyboard and a pointing device (e.g., touch-pad, mouse) and may be used to provide inputs (such as the nodes that are to be maintained, the commands to be remotely executed on the nodes in the data center, the actions to be performed on a selected node, the action to be performed for an error, etc. using the interfaces of FIGS. 3A, 3B and 6). Network interface 780 provides connectivity to a network (e.g., using Internet Protocol), and may be used to communicate with other systems (such as the nodes in data centers 120/130) connected to the network.

Secondary memory 730 may contain hard drive 735, flash memory 736, and removable storage drive 737. Secondary memory 730 may store the data (for example, portions of the commands shown in FIGS. 4A and 4B as well as the commands shown in Appendices A and B, the formed maintenance scripts shown in FIGS. 5A-5C, etc.) and software instructions (which when operative perform the steps of FIG. 2 and cause the configurations of nodes in data centers), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A non-transitory machine readable storage medium storing one or more sequences of instructions for causing a a digital processing system to generate maintenance scripts suitable for software maintenance of nodes in a data center, wherein execution of said one or more sequences of instructions by one or more processors contained in said digital processing system causes said digital processing system to perform the actions of:

receiving a data specifying a set of commands to be executed on a plurality of nodes contained in said data center, said plurality of nodes comprising a first node; and forming a first maintenance script by programmatically incorporating a first set of instructions and a second set of instructions, wherein said first set of instructions, when executed on a management system, is designed to cause said management system to perform a first set of management actions on said management system, wherein said second set of instructions, when executed on said management system, is designed to cause said set of commands to be transmitted to and then executed on said first node, wherein later execution of said first maintenance script on said management system causes execution of said first set of management actions on said management system and said set of commands to be remotely executed on said first node, thereby performing maintenance of said first node, wherein said data is received from a user, and said data received from said user does not specify said first set of management actions, such that said user is relieved of the burden of specifying said management actions in generation of maintenance scripts.

2. The non-transitory machine readable storage medium of claim 1, wherein said plurality of nodes of said data center are of a plurality of node types, wherein said data received from said user comprises first data and second data, wherein said first data specifies a corresponding one of said plurality of node types for each of said plurality of nodes, wherein said second data specifies a corresponding subset of commands for each combination of a node type and a maintenance task, such that each subset of commands when executed on nodes of the corresponding node type in the combination causes the corresponding maintenance task to be performed on the nodes, wherein said forming forms maintenance scripts for each of said plurality of nodes based on a node type of the node specified in said first data and the corresponding subset of commands for the node type specified in said second data.

3. The non-transitory machine readable storage medium of claim 2, wherein said plurality of nodes comprises a primary set of nodes and a standby set of nodes, wherein said primary set of nodes operate together to provide a set of services to users during normal operation, wherein said standby set of nodes are to be used if a disaster occurs at said primary set of nodes, wherein execution of said set of commands on said plurality of nodes in response to said disaster occurring at said primary set of nodes causes said standby set of nodes to operate together to provide said set of services to said users.

4. The non-transitory machine readable storage of claim 2, wherein said forming further forms a central script, a plurality of task-type scripts, a plurality of maintenance scripts including said first maintenance script, and a runner script, wherein said central script is designed to invoke each of said plurality of task-type scripts to perform maintenance of said plurality of nodes, wherein each of said plurality of task-type scripts corresponds to the combination of the node type and the maintenance task, wherein execution of a task-type script causes invocation of a corresponding subset of said plurality of maintenance scripts to cause the corresponding maintenance tasks to be performed on nodes of the corresponding node type, wherein each of said plurality of maintenance scripts is designed to perform a single maintenance task on a single node by invoking said runner script with a node identifier of said single node and a command for performing said single maintenance task as parameters, said runner script containing said first set of instructions and said second set of instructions such that execution of said runner script with a node identifier and one of said set of commands as parameters causes execution of said one of said set of commands on a node identified by said node identifier.

5. The non-transitory machine readable storage medium of claim 2, wherein each of said set of commands specifies the identifier of a corresponding one of a set of component scripts, wherein each component script upon execution on the corresponding node causes a corresponding maintenance task to be performed on said first node, wherein said executing said first maintenance script causes a set of component scripts to be executed on said first node, thereby performing corresponding maintenance tasks on said first node.

6. The non-transitory machine readable storage medium of claim 5, wherein the maintenance task is one of installing, uninstalling, starting, stopping, checking a status of, and configuring a software component in said first node.

7. A data center comprising:
a plurality of nodes, wherein said plurality of nodes comprises a primary set of nodes and a standby set of nodes, wherein said primary set of nodes operate together to provide a set of services to users during normal operation and said standby set of nodes are to be used if a disaster occurs at said primary set of nodes; and
a management system containing a processor and a memory, said processor to retrieve and execute instructions stored in said memory causing said management system to:
receive a data specifying a set of commands to be executed on said plurality of nodes;
form a set of maintenance scripts by programmatically incorporating a first set of instructions and a second set of instructions,
wherein said first set of instructions, when executed on said management system, is designed to cause said management system to perform a first set of management actions on said management system,
wherein said second set of instructions, when executed on said management system, is designed to cause transmission and remote execution of said set of commands on said plurality of nodes;
receive an indication of declaration of a disaster at said primary set of nodes; and
in response to receiving said indication, execute said set of maintenance scripts to cause said standby set of nodes to operate together to provide said set of services to said users,
wherein said data is received from a user, and said data received from said user does not specify said first set of management actions, such that said user is relieved of the burden of specifying said management actions in generation of maintenance scripts.

8. The data center of claim 7, wherein to receive said set of commands, said management system is operable to:
store a corresponding set of component scripts for each of said plurality of nodes, wherein each component script upon execution on the corresponding node causes a corresponding maintenance task to be performed on the node, each component script being identified by a corresponding identifier; and
enable a user to specify the identifiers of a sequence of component scripts as corresponding commands to be remotely executed on said plurality of nodes.

9. The data center of claim 8, wherein said corresponding set of component scripts are stored on the corresponding one of said plurality of nodes.

10. The data center of claim 7, wherein said first set of instructions when executed on said management system causes logging and error handling in relation to execution of said commands.

11. The data center of claim 10, wherein to enable said user to specify said commands, said management system is operable to:
provide, to said user, a first user interface for specifying workflows for performing corresponding maintenance tasks on said plurality of nodes; and
receive, from said user using said first user interface, a workflow for performing a maintenance task, wherein first workflow specifies the identifiers of said sequence of component scripts.

12. The data center of claim 11, wherein the maintenance task is one of installing, uninstalling, starting, stopping, checking a status of, and configuring a software component in said plurality of nodes.

13. The data center of claim 8, wherein said management system is further operable to store said set of maintenance scripts in a scripts repository, said data center further comprising:
a second system operable to:
receive said indication of declaration of said disaster;
in response to receiving said indication, retrieve said set of maintenance scripts from said scripts repository; and
execute said set of maintenance scripts to cause said standby set of nodes to operate together to provide said set of services to said users,
wherein said second system is different from said management system.

14. The data center of claim 7, wherein said plurality of nodes are of a plurality of node types, wherein said data received from said user comprises first data and second data,
wherein said first data specifies a corresponding one of said plurality of node types for each of said plurality of nodes,
wherein said second data specifies a corresponding subset of commands for each combination of a node type and a maintenance task, such that each subset of commands when executed on nodes of the corresponding node type in the combination causes the corresponding maintenance task to be performed on the nodes,
wherein said management system forms maintenance scripts for each of said plurality of nodes based on a node type of the node specified in said first data and the corresponding subset of commands for the node type specified in said second data.

15. The data center of claim 14, wherein said management system further forms a central script, a plurality of task-type scripts, said set of maintenance scripts, and a runner script, wherein said central script is designed to invoke each of said plurality of task-type scripts to perform maintenance of said plurality of nodes, wherein each of said plurality of task-type scripts corresponds to the combination of the node type and the maintenance task, wherein execution of a task-type script causes invocation of a corresponding subset of said plurality of maintenance scripts to cause the corresponding maintenance tasks to be performed on nodes of the corresponding node type, wherein each of said set of maintenance scripts is designed to perform a single maintenance task on a single node by invoking said runner script with a node identifier of said single node and a command for performing said single maintenance task as parameters, said runner script containing said first set of instructions and said second set of instructions such that execution of said runner script with a node identifier and one of said set of commands as parameters causes execution of said one of said set of commands on a node identified by said node identifier.

16. A method generating maintenance scripts suitable for software maintenance of nodes in a data center, said method being performed in a digital processing system, said method comprising:
receiving a data specifying a set of commands to be executed on a plurality of nodes contained in said data center, said plurality of nodes comprising a first node; and
forming a first maintenance script by programmatically incorporating a first set of instructions and a second set of instructions,
wherein said first set of instructions, when executed on a management system, is designed to cause said management system to perform a first set of management actions on said management system, wherein said second set of instructions, when executed on said management system, is designed to cause said set of commands to be transmitted to and then executed on said first node, wherein later execution of said first maintenance script on said management system causes execution of said first set of management actions on said management system and said set of commands to be remotely executed on said first node, thereby performing maintenance of said first node, wherein said data is received from a user, and said data received from said user does not specify said first set of management actions, such that said user is relieved of the burden of specifying said management actions in generation of maintenance scripts.

* * * * *

UNITED STATES PATENT AND TRADEMARK OFFICE
CERTIFICATE OF CORRECTION

| | |
|---|---|
| PATENT NO. | : 8,438,418 B2 |
| APPLICATION NO. | : 12/826678 |
| DATED | : May 7, 2013 |
| INVENTOR(S) | : Ashraff et al. |

It is certified that error appears in the above-identified patent and that said Letters Patent is hereby corrected as shown below:

In the Claims

In column 13, line 35, in Claim 1, after "causing" delete "a".

In column 14, line 29, in Claim 4, delete "storage" and insert -- storage medium --, therefor.

Signed and Sealed this
Seventeenth Day of September, 2013

Teresa Stanek Rea
*Deputy Director of the United States Patent and Trademark Office*